Figure 1:
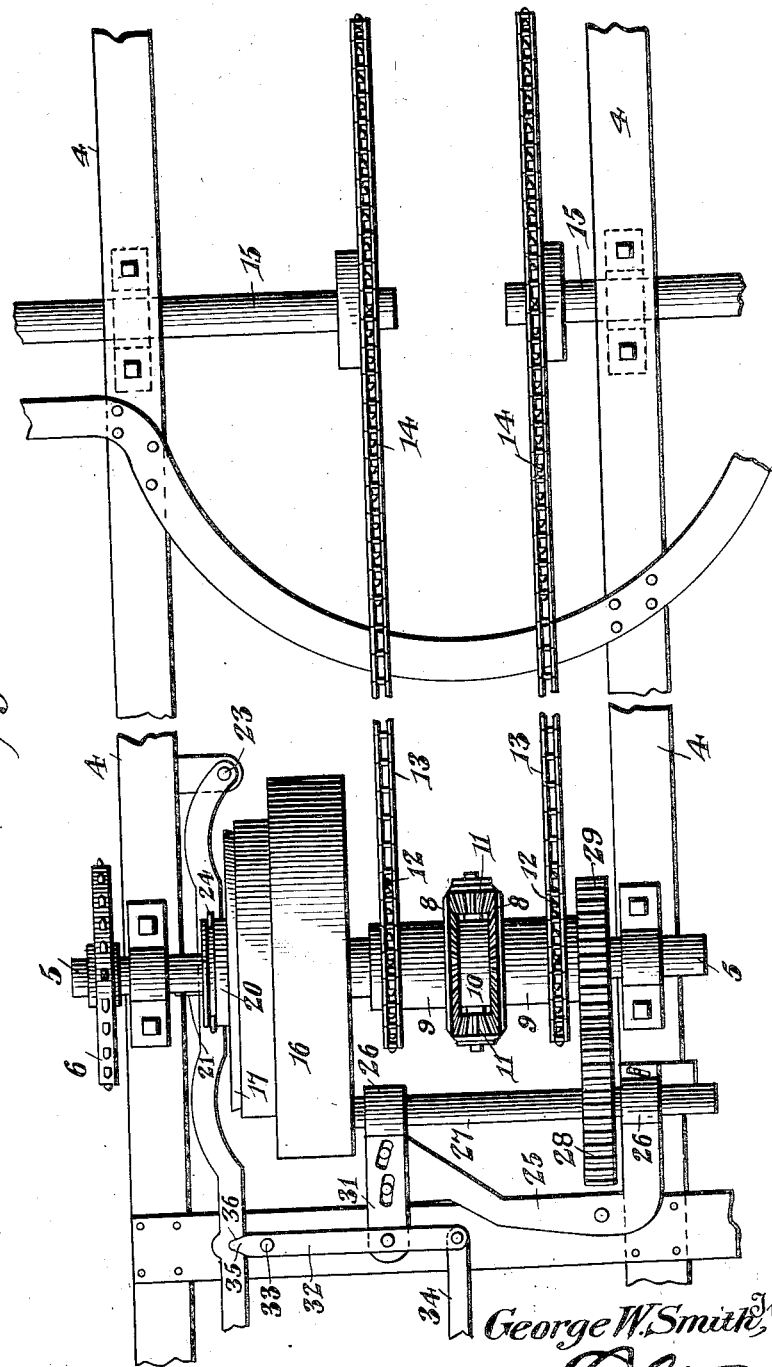

No. 891,108. PATENTED JUNE 16, 1908.
G. W. SMITH.
POWER TRANSMITTING MECHANISM.
APPLICATION FILED MAY 27, 1907.

4 SHEETS—SHEET 1.

Witnesses
George W. Smith, Inventor
By
Attorney

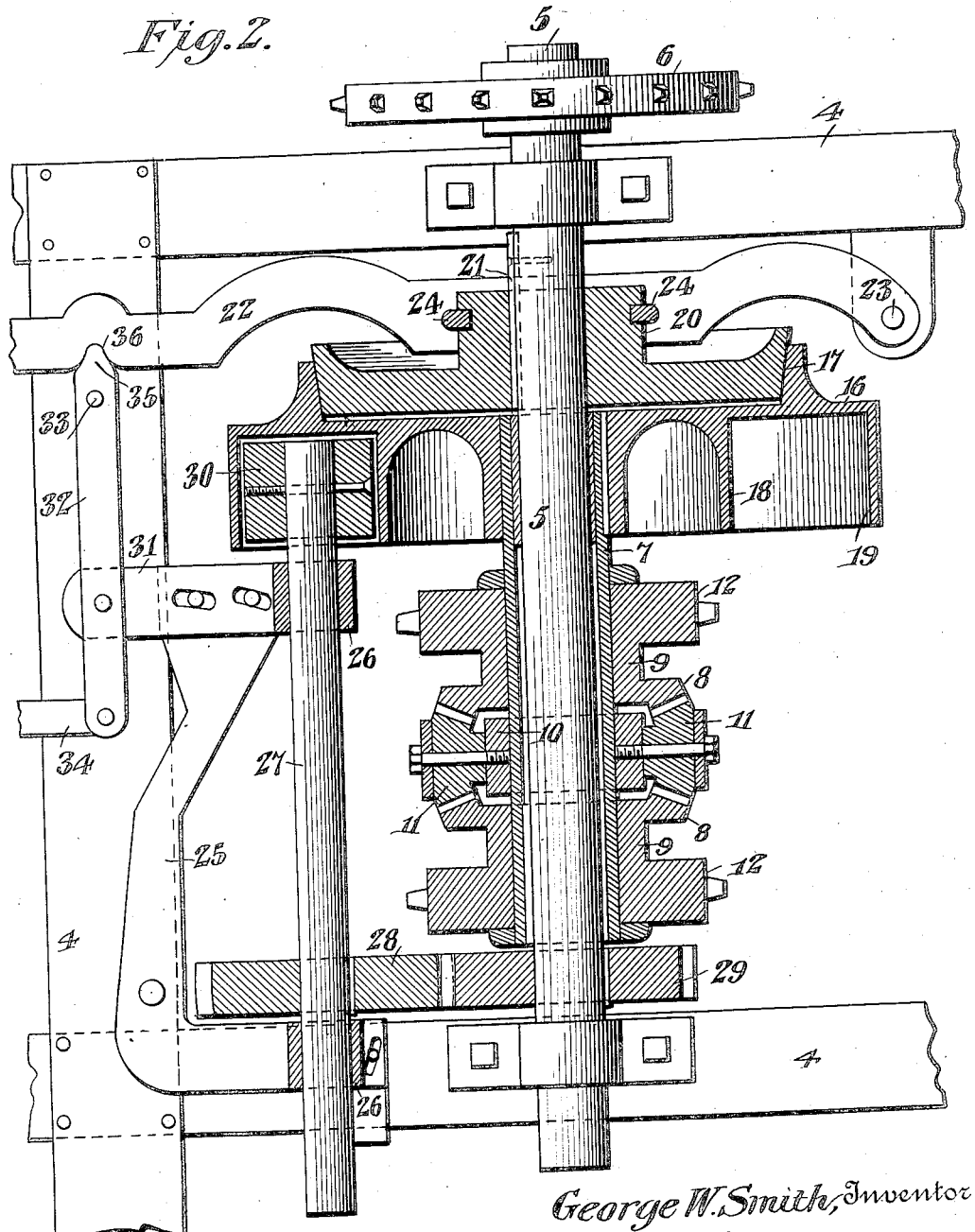

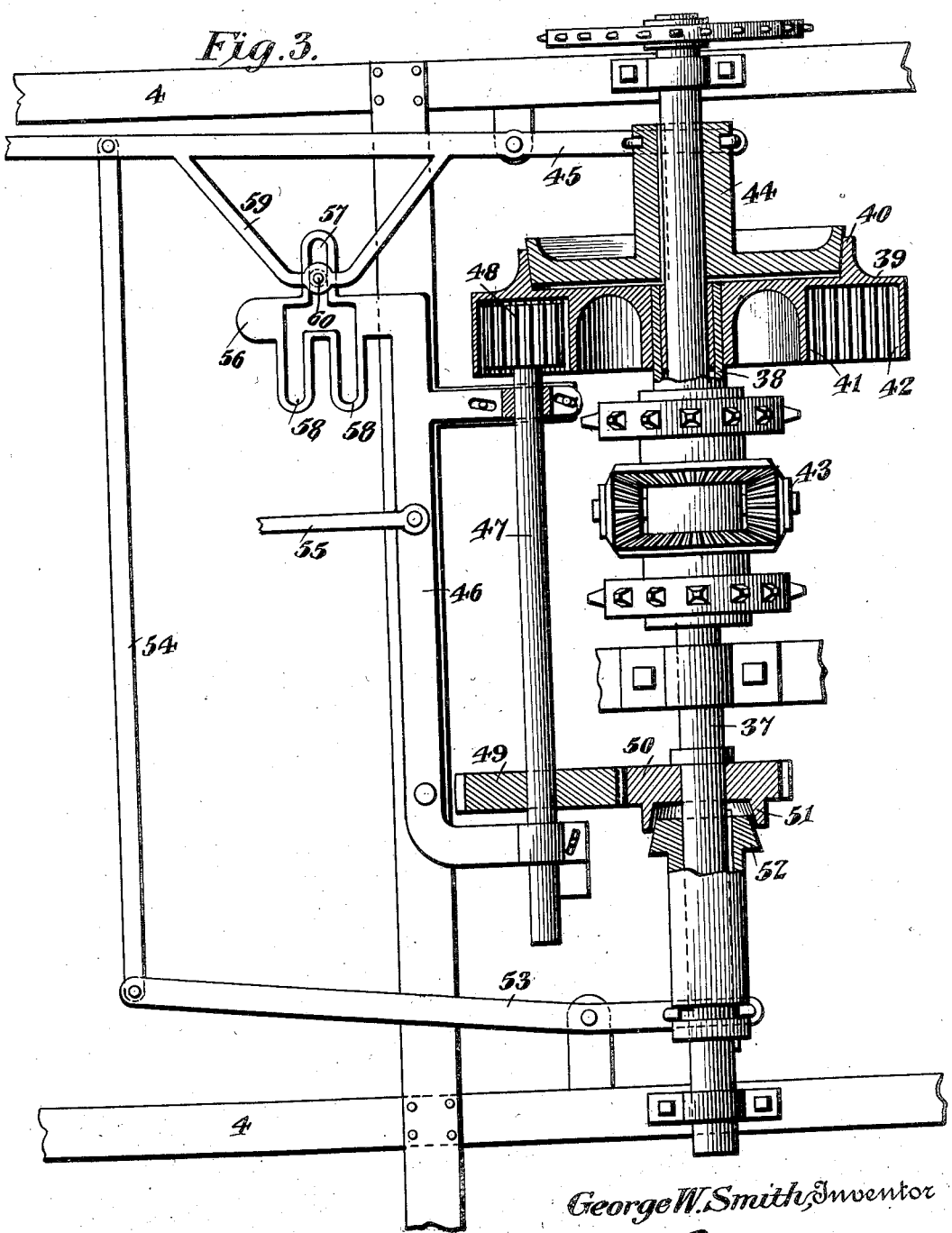

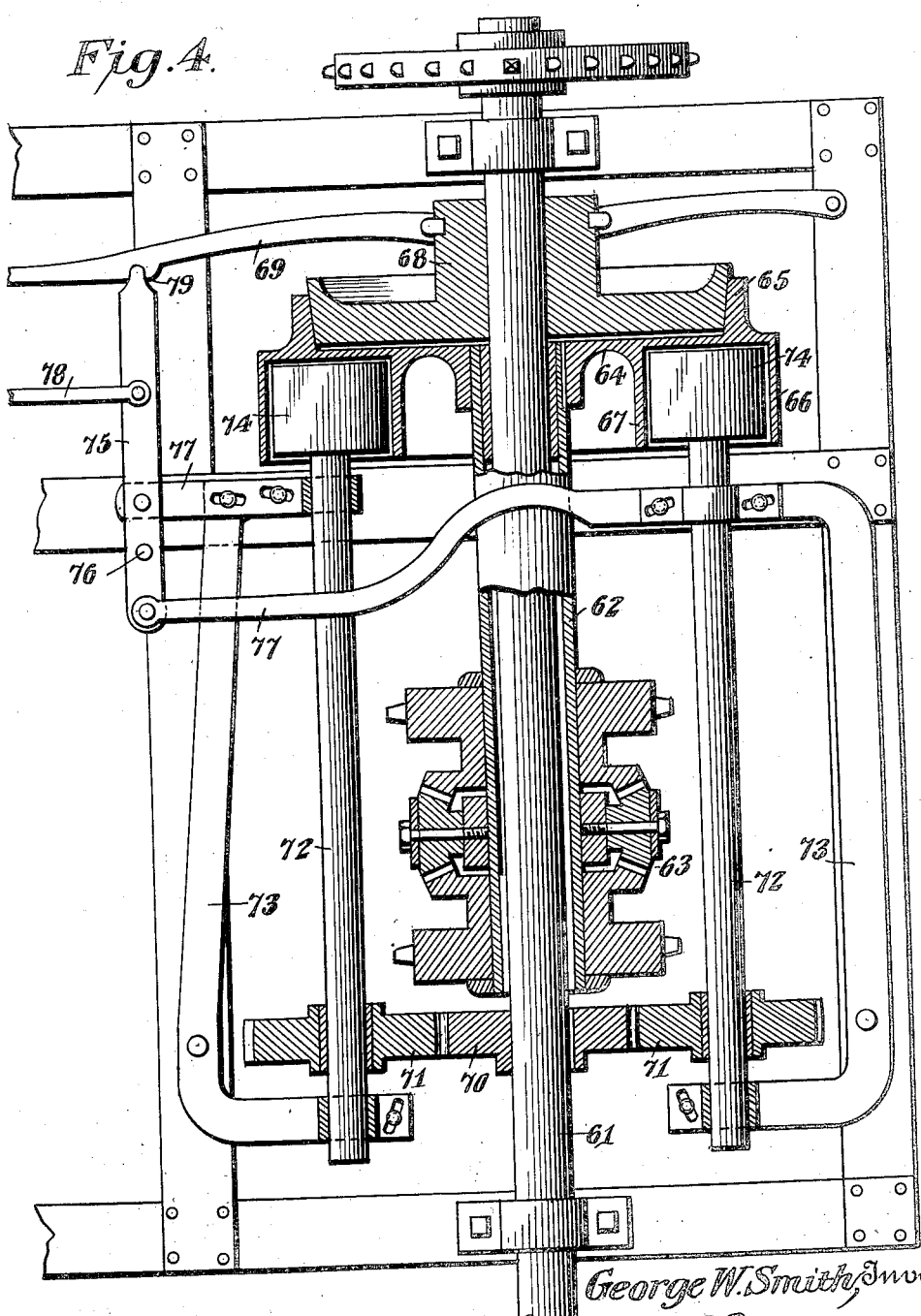

UNITED STATES PATENT OFFICE.

GEORGE WILLIAM SMITH, OF HENRY, MISSOURI.

POWER-TRANSMITTING MECHANISM.

No. 891,108.

Specification of Letters Patent.

Patented June 16, 1908.

Application filed May 27, 1907. Serial No. 376,008.

*To all whom it may concern:*

Be it known that I, GEORGE WILLIAM SMITH, a citizen of the United States, residing at Henry, in the county of Ray and State of Missouri, have invented a new and useful Power-Transmitting Mechanism, of which the following is a specification.

This invention relates to means for transmitting power from a driving member to a driven member, and while particularly intended for transmitting motion from the motor of an automobile to the wheels thereof, it is not necessarily limited to this use.

The primary object of the present invention is to provide an exceedingly simple and effective mechanism of a novel nature, whereby variable and reverse speeds can be obtained without changing the direction or speed of the motor.

Another and important object is to provide mechanism, which will prevent elements that operate at different rates of speed being thrown into action, at the same time thus avoiding danger of breaking the parts from this cause.

In the accompanying drawings, Figure 1 is a plan view of one embodiment of the invention. Fig. 2 is a horizontal sectional view therethrough. Fig. 3 is a sectional view through a modified from of construction. Fig. 4 is a horizontal sectional view through another embodiment of the invention.

Similar reference numerals designate corresponding parts in all the figures of the drawings.

In the embodiment illustrated in the first two figures, a suitable supporting frame 4 is employed, on which is journaled a driving shaft 5. The shaft is connected to an engine or motor by any suitable means, as for instance, a sprocket chain, that operates around a sprocket wheel 6 fixed to one end of the shaft. A driven sleeve 7 is loosely journaled on the shaft, and mounted thereon is differential gearing. This gearing consists of opposing gear wheels 8 fixed to collars 9 that are loosely mounted on the sleeve 7. Another collar 10 is fixed to the sleeve between the collars 9, and planetary gears 11 journaled upon the fixed collar 10 are in mesh with the opposing gears 8. The collars 9 furthermore have sprocket wheels 12, which are preferably connected by sprocket chains 13 to sprocket wheels 14 fixed to the wheel shafts 15.

The shaft 5 and sleeve 7 constitute respectively driving and driven members. Fixed to one end of the driven member or sleeve 7 is a wheel element 16 having a friction clutch face 17 on its outerside and external and internal gear faces 18 and 19 on its inner side. In the present embodiment, these are friction faces. A clutch element 20 is slidably mounted on the shaft 5, and is feathered thereto, as shown at 21. This clutch element is movable into and out of coaction with the clutch element or face 17, this movement being effected by a lever 22 fulcrumed at one end, as shown at 23, and having a suitable yoke connection 24 with the hub of the element 20. A swinging carrier frame 25 is pivoted on the supporting frame 4, and has angularly disposed arms carrying boxes 26. In these boxes, a countershaft 27 is journaled. The shaft at one end is provided with a gear 28 that is in mesh with another gear 29 fixed to the driving shaft 5. The opposite end of the countershaft is located between the internal and external gear face 19 and 18, and carries a pinion 30 movable into and out of coaction with either of said faces on the swinging movement of the shaft. The teeth of the gear 28 are preferably curved, as shown to permit the swinging movement of the gear, while maintaining proper coaction with the teeth of the gear 29.

The frame 25 has a forwardly extending ear 31 that is pivoted to a locking lever 32 fulcrumed contiguous to one end, as shown at 33. A link 43, connected to the other end of the lever 32, constitutes actuating means therefor. The fulcrumed end of the lever 32 is preferably beveled off or pointed, as shown at 35, and a notch or seat 36, formed in the lever 32, receives said pointed end when the clutch element 20 is in coaction with the clutch element 17. When the pointed end 25 is in its seat 36, the pinion 30 is out of coaction with both the internal and external gear faces 18 and 19.

The operation of this structure is substantially as follows: If power is applied to the sprocket wheel, 6, from a motor or engine and if the clutch element 20 is out of coaction with the clutch element 17 and the pinion 30 is out of engagement with both faces 18 and 19, the driving shaft 5 will rotate freely without operating the sleeve 7. If now the lever 22 is swung to move the clutch element 22 into coaction with the clutch element 17, it will be evident that the sleeve 7 will be clutched directly to the shaft and the two parts will rotate together. Thus motion will be transmitted to the sprocket wheels 12 through the medium of the differential gearing. When the parts are in this condition, as already shown, the countershaft will be locked against swinging movement with the pinion 30 out of mesh with both of the gear faces. When, however, the lever 23 is thrown outwardly, and the clutch element 20 is out of mesh with the clutch element 17, the frame 25 can be swung so as to throw the pinion 30 into engagement with either the external or the internal gear faces or elements 18—19. In either case, power will then be transmitted from the driving shaft 5 through the gearing 28—29, the countershaft 27 and the pinion 30 to the sleeve 7 so that said sleeve can be rotated in opposite directions at different rates of speed. With this structure therefore two speeds in one direction can be secured, and a reverse movement at a slow rate of speed.

A slightly different embodiment of the invention is illustrated in Fig. 3. In this form, the driving shaft is designated 37, and has a driven sleeve 38 loosely journaled thereon. The wheel 39 has an outer clutch element 40 and external and internal gear elements or faces 41 and 42 on its inner side. In the present embodiment, these elements are provided with teeth, and thus it will be evident that either friction or toothed gearing may be employed. Differential gearing 43 of the character already described, is mounted on the sleeve 38. A sliding clutch element 44 is feathered upon the driving shaft 37, and is movable into and out of coaction with the element 40, its movement being controlled by a lever 45. A swinging carrier frame 46 has journaled thereon a countershaft 47, and a pinion 48, fixed to one end of the countershaft, is movable into coaction with either of the gear elements 41 and 42. This pinion can also be placed in an intermediate position where it is out of mesh with both of said elements. The countershaft 47 has fixed thereto a gear wheel 49 that is in mesh with another gear wheel 50 loosely journaled on the driving shaft 37. The gear wheel 50 carries a female clutch element 51 with which coöperates a male clutch element 52 feathered upon the shaft 37 and operated by a lever 53. A link 54 connects the lever 53 with the lever 45, and by this means, when one of the clutches is thrown out of coaction, the other is thrown into operation. The swinging carrier frame 46 is operated by any suitable means connected to said frame by a link 55, and said carrier frame has a forwardly extending arm 56 provided with a substantially Y-shaped slot, one portion of the slot being designated 57, the arms thereof being designated 58. The lever 45 is provided with a bracket 59 that carries a stud 60, which operates in the slot. In this embodiment of the invention, when the clutch element 44 is in coaction with the clutch element 40 and the driven sleeve 38 is thus fixed directly to the driving shaft 37, the clutch element 52 will be out of coaction with the clutch element 51. It will also be observed that the stud 60 will be in the portion 57 of the Y-shaped slot of the carrier frame. Consequently said frame will be locked in a position that will maintain the pinion 48 out of mesh with both the gear elements 41 and 42. When the lever 45 is swung to carry the clutch element 44 out of coaction with the clutch element 40, the stud 60 will reach a position at the juncture of the portions 57 and 58 of the slot in the carrier frame before the clutch elemnt 52 moves into coaction with the clutch element 51. Therefore the carrier frame can be swung freely in either direction so as to carry the pinion 48 into mesh with either the external or internal gear elements 41—42. When in mesh with either, the lever 45 is given a further movement, and the stud 60 will then ride into one of the arms 58 of the slot. This further movement effects a movement of the clutch element 52 into coaction with the clutch element 51, and the countershaft will thus be geared to the driving shaft, so that the pinion will be operated, and the driven sleeve rotated.

In Fig. 4 is illustrated a modification of the structure disclosed in Figs. 1 and 2. In this embodiment, the driving shaft 61 is employed, as before, and on it is journaled a driven sleeve 62 having differential gearing 63. A rotary wheel element 64 is keyed or otherwise secured to the sleeve 62, and has a clutch member 65 on its outer side and internal and external gear elements 66 and 67 on its inner side. Another clutch member 68, slidable upon the shaft 61, coöperates with the member 65, and is operated by a lever 69. A gear wheel 70 is fixed to the shaft 61, and meshing therewith are gear wheels 71 mounted on shafts 72 that are journaled in pivotally mounted carrier frames 73. These shafts have friction wheels 74 movable into coaction with either the internal or external gear elements 66 and 67. In order to effect their simultaneous movement in opposite directions and consequently into coaction with the same gear elements, a lever 75 is employed that is fulcrumed between its ends, as shown at 76. Links 77 are pivoted to the lever 75 on opposite sides of its fulcrum 76, and are respectively connected to the frames 73. An operating device 78 is connected to the lever. It will be observed that the levers 69 and 75 have the interlocking engagement 79 as in the first described embodiment of the invention. In this structure, it will be observed that the sleeve 62 can be clutched directly to the shaft 61 by properly operating the clutch member 68. When so clutched, the gear wheels 74 are locked out of engagement with both the internal and external gear elements 66 and 67. When, however, the lever 69 is thrown outwardly to disengage the clutch member 68 from the clutch member 65, then the lever 75 is free to be operated, and if moved in one direction or the other, the wheels 74 will be moved either into engagement with the external gear elements 67 or the internal gear elements 66. This particular structure is advantageous in that it provides small transmission mechanism that will be very compact and at the same time powerful.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Patent, is:—

1. In mechanism of the character described, the combination with a shaft member, of a sleeve member rotatably mounted thereon, relatively movable clutch elements carried by the shaft and sleeve for connecting the same, and differential gearing mounted on one of the members.

2. In mechanism of the character described, the combination with a shaft, of a sleeve rotatably mounted on the shaft, relatively movable clutch elements carried by the shaft and sleeve, and differential gearing mounted on the sleeve.

3. In mechanism of the character described, the combination with a shaft, of a sleeve rotatably mounted on the shaft, relatively movable clutch elements carried by the shaft and sleeve, collars loosely journaled on the sleeve and having opposing gears, and planet gears fixed to the sleeve and engaging the opposing gears.

4. In mechanism of the character described, the combination with a driving shaft, of a driven sleeve loosely journaled thereon, a clutch member fixed to the sleeve, a coacting clutch member slidable on the shaft, collars loosely journaled on the sleeve, a collar fixed to the sleeve between the loose collars, opposing bevel gears fixed to the loose collars, and planet gears journaled on the fixed collar and meshing with the beveled gears.

5. In mechanism of the character described, the combination with driving and driven members, of a wheel element associated with one of the members, said wheel element having a clutch face and a gear face, a clutch element carried by the other member and coacting with the clutch face, and a gear connected to said other member and coöperating with the gear face.

6. In mechanism of the character described, the combination with a rotatable driving member and a rotatable driven member having substantially coincident axes of rotation, one of said members having internal and external gear elements, a shaft geared to the other member and disposed substantially parallel to said axes of rotation, and a gear element carried by the shaft and movable into engagement with either the internal or external gear elements.

7. In mechanism of the character described, the combination with a shaft member, of a sleeve member journaled on the shaft member, a countershaft located alongside the members and geared to one member, internal and external gear elements carried by the other member, and a third gear element carried by the countershaft and movable into engagement with either the internal or external gear element.

8. In mechanism of the character described, the combination with a shaft member, of a sleeve member loosely journaled on the shaft member, differential gearing mounted on the sleeve, a swinging countershaft located alongside the members and geared to the shaft member, external and internal gear elements carried by the sleeve member, a pinion carried by the countershaft and movable into engagement with either the internal or external gear element, and means for swinging the shaft.

9. In mechanism of the character described, the combination with a driving member and a driven member, of a clutch for directly connecting the driving and driven members, one of said members having internal and external gear elements, a shaft geared to the other member, and a gear element carried by the shaft and movable into engagement with either the internal or external gear elements.

10. In mechanism of the character described, the combination with a shaft member, of a sleeve member journaled on the shaft member, a countershaft located alongside the members and geared to one member, internal and external gear elements carried by the other member, a third gear element carried by the countershaft and movable into engagement with either the internal or external gear elements, means for moving said third gear element, and a clutch for directly connecting the shaft and sleeve members.

11. In mechanism of the character described, the combination with a driving shaft, of a driven sleeve loosely journaled on the driving shaft, a clutch element fixed to one end of the sleeve, a clutch element slidable on the shaft and movable into and out of coaction with the first mentioned clutch element, a countershaft located alongside the driving shaft and driven sleeve, gearing connecting the shafts, internal and external gear elements carried by the sleeve, and a pinion carried by the countershaft and movable into engagement with either the internal or external gear.

12. In mechanism of the character described, the combination with driving and driven members, of a wheel element associated with one of the members, said wheel element having a clutch face, and external and internal gear faces, and means having connections with the other member and coöperating with the different faces of said wheel element.

13. In mechanism of the character described, the combination with a shaft member, of a sleeve member loosely journaled on the shaft member, a wheel element carried by one member, said wheel element having a clutch face and internal and external gear faces, a clutch member carried by the other element and coacting with the clutch face, and a gear having gear connections with the said other member and movable into engagement with either gear face.

14. In mechanism of the character described, the combination with a shaft, of a sleeve loosely journaled on the shaft, a wheel element fixed to the sleeve and having a clutch face on its outer side, said wheel element having external and internal gear faces on its inner side, a clutch element slidably mounted on the shaft and movable into and out of coaction with the clutch face, a countershaft, gearing connecting the shaft and countershaft, a pinion fixed to the countershaft and movable into and out of coaction with either the internal or external gear face, and means for moving the countershaft to carry said pinion into coaction with either gear face.

15. In mechanism of the character described, the combination with a driving member and a driven member, of a clutch for directly connecting the driving and driven members, one of said members having internal and external gear elements, a shaft geared to the other member, a gear element carried by the shaft and movable into engagement with either the internal or external gear element, and means for locking said gear element out of coaction with both the internal and external gear elements when the clutch is in operative condition.

16. In mechanism of the character described, the combination with relatively rotatable members, of a clutch for connecting the members, said clutch comprising elements relatively movable into and out of coaction, detachably associated gear elements connecting the members when the clutch elements are out of coaction, means for moving the gear elements into associated relation, and means that engages the operating means for locking the gear elements in detached relation when the clutch elements are associated.

17. In mechanism of the character described, the combination with relatively rotatable members, of a clutch for directly connecting the members, said clutch including elements movable into and out of coaction, a swinging countershaft geared to one of the members and having a detachable engagement with the other member, means for swinging the shaft, and means for holding the shaft against swinging movement when the clutch elements are in coacting relation.

18. In mechanism of the character described, the combination with relatively rotatable members, of a clutch for directly connecting the members, said clutch comprising elements movable into and out of coaction, a swinging countershaft geared to one of the members and having a detachable engagement with the other member, a swinging carrier frame for the shaft having a substantially Y-shaped slot, and a lever for operating the clutch, said lever having a stud operating in the slot.

19. In mechanism of the character described, the combination with a driving shaft, of a sleeve loosely journaled thereon, a clutch connection between the shaft and sleeve comprising elements movable into and out of coaction, a countershaft, gears connecting the shaft and countershaft, one of said gears being loose upon the former, a clutch for connecting the shaft and loose gear, said clutch including relatively movable elements, and means for throwing one clutch into and the other out of coaction.

20. In mechanism of the character described, the combination with a driving shaft, of a driving sleeve loosely journaled on the driving shaft, differential gearing mounted on the sleeve, a wheel element fixed to one end of the sleeve and having an outer clutch face, said wheel element having external and internal gears on its inner side, a clutch element slidably mounted on the shaft and movable into coaction with the clutch face of the wheel element, a swinging countershaft having a pinion movable into and out of coaction with either the internal or external gear, a swinging carrier frame for said countershaft having a substantially Y-shaped slot, gears connecting the shaft and countershaft, the gear that is on the shaft being loose thereupon, a clutch comprising relatively movable elements, one of which is slidably mounted on the shaft, the other being carried by the loose gear, levers connected to the slidable gear elements, a connection between the levers, and a stud carried by one of the levers and operating in the Y-shaped slot.

In testimony, that I claim the foregoing as my own, I have hereto affixed my signature in the presence of two witnesses.

GEORGE WILLIAM SMITH.

Witnesses:
WILLIAM A. SISK,
JOHN VOGT.